US008976913B2

(12) United States Patent
Buehner et al.

(10) Patent No.: US 8,976,913 B2
(45) Date of Patent: Mar. 10, 2015

(54) ADAPTIVE PATTERN DEPENDENT NOISE PREDICTION ON A FEED FORWARD NOISE ESTIMATE

(75) Inventors: Michael R. Buehner, Fort Collins, CO (US); David Noeldner, Fort Collins, CO (US)

(73) Assignee: LSI Corporation, San Jose, CA (US)

( * ) Notice: Subject to any disclaimer, the term of this patent is extended or adjusted under 35 U.S.C. 154(b) by 1940 days.

(21) Appl. No.: 12/212,499

(22) Filed: Sep. 17, 2008

(65) Prior Publication Data
US 2010/0067628 A1 Mar. 18, 2010

(51) Int. Cl.
H03K 6/04 (2006.01)
H04L 25/03 (2006.01)
G06K 9/00 (2006.01)

(52) U.S. Cl.
CPC ........ *H04L 25/03057* (2013.01); *G06K 9/0051* (2013.01)
USPC ....................................... 375/350

(58) Field of Classification Search
CPC ........... H04L 25/03057; G06K 9/0051; G11B 20/22; H04B 1/123
USPC ......... 375/231, 233, 263, 341, 343, 345, 346, 375/350
See application file for complete search history.

(56) References Cited

U.S. PATENT DOCUMENTS

| 3,973,182 A | 8/1976 | Kataoka |
| 3,973,183 A | 8/1976 | Katalka |
| 4,024,571 A | 5/1977 | Dischert et al. |
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,619,539 A * | 4/1997 | Coker et al. ................. 375/341 |
| 5,668,679 A | 9/1997 | Swearingen et al. |
| 5,696,639 A | 12/1997 | Spurbeck et al. |
| 5,781,129 A | 7/1998 | Schwartz et al. |
| 5,798,885 A | 8/1998 | Saiki et al. |
| 5,835,295 A | 11/1998 | Behrens |
| 5,844,920 A | 12/1998 | Zook et al. |
| 5,852,524 A | 12/1998 | Glover et al. |
| 5,986,830 A | 11/1999 | Hein |
| 5,987,562 A | 11/1999 | Glover |

(Continued)

OTHER PUBLICATIONS

Annampedu, V. and Aziz, P.M., "Adaptive Algorithms for Asynchronous Detection of Coded Servo Signals Based on Interpolation", IEEE Trans. on Mag., vol. 41, No. 10, Oct. 2005.

(Continued)

*Primary Examiner* — Syed Haider
(74) *Attorney, Agent, or Firm* — Hamilton DeSanctis & Cha

(57) ABSTRACT

Various embodiments of the present invention provide systems and methods for processing data. As one example, a circuit is disclosed that includes a pre-detector that detects an estimated pattern in a digital input signal, and a summation element that subtracts the estimated pattern from the digital input signal to yield a noise estimate. The circuit further includes a data dependent noise prediction filter that is adaptively tuned to detect a noise pattern, and that filters the noise estimate to provide a filtered noise estimate.

20 Claims, 5 Drawing Sheets

(56) References Cited

U.S. PATENT DOCUMENTS

| | | |
|---|---|---|
| 6,009,549 A | 12/1999 | Bliss et al. |
| 6,023,383 A | 2/2000 | Glover et al. |
| 6,069,583 A | 5/2000 | Silvestrin et al. |
| 6,081,397 A | 6/2000 | Belser |
| 6,111,712 A | 8/2000 | Vishakhadatta et al. |
| 6,208,478 B1 | 3/2001 | Chiu et al. |
| 6,278,591 B1 | 8/2001 | Chang |
| 6,404,829 B1 | 6/2002 | Sonu |
| 6,441,661 B1 | 8/2002 | Aoki et al. |
| 6,490,110 B2 | 12/2002 | Reed et al. |
| 6,493,162 B1 | 12/2002 | Fredrickson |
| 6,519,102 B1 | 2/2003 | Smith |
| 6,530,060 B1 | 3/2003 | Vis et al. |
| 6,603,622 B1 | 8/2003 | Christiansen et al. |
| 6,606,048 B1 | 8/2003 | Sutardja |
| 6,625,235 B1* | 9/2003 | Coker et al. .......... 375/341 |
| 6,633,447 B2 | 10/2003 | Franck et al. |
| 6,646,822 B1 | 11/2003 | Tuttle et al. |
| 6,657,802 B1 | 12/2003 | Ashley et al. |
| 6,775,529 B1 | 8/2004 | Roo |
| 6,788,484 B2 | 9/2004 | Honma |
| 6,813,108 B2 | 11/2004 | Annampedu et al. |
| 6,816,328 B2 | 11/2004 | Rae |
| 6,839,014 B2 | 1/2005 | Uda |
| 6,856,183 B2 | 2/2005 | Annampedu |
| 6,876,511 B2 | 4/2005 | Koyanagi |
| 6,912,099 B2 | 6/2005 | Annampedu et al. |
| 6,963,521 B2 | 11/2005 | Hayashi |
| 6,999,257 B2 | 2/2006 | Takeo |
| 6,999,264 B2 | 2/2006 | Ehrlich |
| 7,002,761 B1 | 2/2006 | Sutardja et al. |
| 7,038,875 B2 | 5/2006 | Lou et al. |
| 7,072,137 B2 | 7/2006 | Chiba |
| 7,082,005 B2 | 7/2006 | Annampedu et al. |
| 7,092,462 B2 | 8/2006 | Annampedu et al. |
| 7,116,504 B1 | 10/2006 | Oberg |
| 7,126,776 B1 | 10/2006 | Warren, Jr. et al. |
| 7,136,250 B1 | 11/2006 | Wu et al. |
| 7,154,689 B1 | 12/2006 | Shepherd et al. |
| 7,180,693 B2 | 2/2007 | Annampedu et al. |
| 7,187,739 B2 | 3/2007 | Ma |
| 7,191,382 B2 | 3/2007 | James et al. |
| 7,193,544 B1 | 3/2007 | Fitelson et al. |
| 7,193,798 B2 | 3/2007 | Byrd et al. |
| 7,199,961 B1 | 4/2007 | Wu et al. |
| 7,203,013 B1 | 4/2007 | Han et al. |
| 7,206,146 B2 | 4/2007 | Flynn et al. |
| 7,230,789 B1 | 6/2007 | Brunnett et al. |
| 7,253,984 B1 | 8/2007 | Patapoutian et al. |
| 7,301,717 B1 | 11/2007 | Lee et al. |
| 7,308,057 B1 | 12/2007 | Patapoutian |
| 7,362,536 B1 | 4/2008 | Liu et al. |
| 7,375,918 B1 | 5/2008 | Shepherd et al. |
| 7,411,531 B2 | 8/2008 | Aziz et al. |
| 7,420,498 B2 | 9/2008 | Barrenscheen |
| 7,423,827 B2 | 9/2008 | Neville et al. |
| 7,446,690 B2 | 11/2008 | Kao |
| 7,499,238 B2 | 3/2009 | Annampedu |
| 7,620,101 B1 | 11/2009 | Jenkins |
| 7,788,572 B1* | 8/2010 | Ulriksson .......... 714/795 |
| 2002/0001151 A1 | 1/2002 | Lake |
| 2002/0150179 A1 | 10/2002 | Leis et al. |
| 2002/0176185 A1 | 11/2002 | Fayeulle et al. |
| 2002/0181377 A1 | 12/2002 | Nagata et al. |
| 2003/0095350 A1 | 5/2003 | Annampedu et al. |
| 2005/0046982 A1 | 3/2005 | Liu et al. |
| 2005/0157415 A1 | 7/2005 | Chiang |
| 2005/0195925 A1* | 9/2005 | Traber .......... 375/343 |
| 2005/0213652 A1* | 9/2005 | Higashino .......... 375/233 |
| 2005/0243455 A1 | 11/2005 | Annampedu |
| 2006/0256898 A1* | 11/2006 | Popper et al. .......... 375/346 |
| 2007/0071152 A1 | 3/2007 | Chen et al. |
| 2007/0104300 A1 | 5/2007 | Esumi et al. |
| 2007/0183073 A1 | 8/2007 | Sutardja et al. |
| 2007/0230015 A1 | 10/2007 | Yamashita |
| 2007/0263311 A1 | 11/2007 | Smith |
| 2008/0002791 A1* | 1/2008 | Gratrix et al. .......... 375/341 |
| 2008/0080082 A1 | 4/2008 | Erden et al. |
| 2008/0212715 A1 | 9/2008 | Chang |
| 2008/0266693 A1 | 10/2008 | Bliss et al. |
| 2009/0002862 A1 | 1/2009 | Park |
| 2009/0142620 A1 | 6/2009 | Yamamoto et al. |
| 2009/0161747 A1* | 6/2009 | Aziz et al. .......... 375/231 |
| 2011/0013734 A1* | 1/2011 | Popper et al. .......... 375/346 |

OTHER PUBLICATIONS

Aziz and Annampedu, "Asynchronous Maximum Likelihood (ML) Detection of Servo repeatable Run Out (RRO) Data" Published prior to 2006.

Aziz & Annampedu, "Interpolation Based Maximum-Likelihood(ML) Detection of Asynchronous Servo Repeatable Run Out (RRO) Data", IEEE Int. Mag. Con., vol. 42, No. 10, Oct. 2006.

* cited by examiner

ADAPTIVE PATTERN DEPENDENT NOISE PREDICTION ON A FEED FORWARD NOISE ESTIMATE

BACKGROUND OF THE INVENTION

The present invention is related to systems and methods for processing information, and more particularly to systems and methods for processing information received in a data transfer operation.

Data transfer systems typically include a receiver that converts an analog input into a stream of digital samples representing the analog input. For example, in a hard disk drive system, digital information is converted to an analog signal that is stored as a magnetic signal on a storage medium. The magnetic information is later sensed and converted back to an analog signal using a read circuit. The received analog signal is converted back to digital information representing the digital information originally provided to the storage medium. As another example, a wireless communication system involves a transmitter that receives digital information, and converts it to an analog signal that is transmitted. The analog signal is received and converted back to the original digital information that was originally prepared for transmission.

In such systems, the receiver typically utilizes a Viterbi algorithm data detector that is able to receive information including one or more errors, and to perform some level of error correction to reduce or eliminate any errors. Many approaches have been introduced to increase the achievable detector performance. For example, limited length pattern prediction filters looking only at previous bits on the media have been utilized. Such prediction filters have been tightly coupled to the final Viterbi detector target values, and operate as co-optimized filters that affect both the noise and expected portions of the received samples. Such approaches exhibit a variety of deficiencies including, but not limited to, an inability to consider the effect on a bit where a variety of different transitions may be involved, only a limited ability to de-correlate pattern dependent noise, and a length of data dependent detection that is fixed to the length of a final Viterbi target. Other approaches involve pattern dependent noise prediction to increase the bit error rate performance, but such implementations are typically highly complex. Further, the complexity of such approaches often causes a variety of difficulties in timing closure. To assure timing closure, such implementations are non-optimal and result in little if any increase in performance.

Hence, for at least the aforementioned reasons, there exists a need in the art for advanced systems and methods for processing received information.

BRIEF SUMMARY OF THE INVENTION

The present invention is related to systems and methods for processing information, and more particularly to systems and methods for processing information received in a data transfer operation.

Various embodiments of the present invention provide data decoding circuits that include a pre-detector that detects an estimated pattern in a digital input signal, and a summation element that subtracts the estimated pattern from the digital input signal to yield a noise estimate. The circuits further include a data dependent noise prediction filter that is adaptively tuned to detect a noise pattern, and that filters the noise estimate to provide a filtered noise estimate. In some cases of the aforementioned embodiments, the circuits further include a post-detector that performs a data detection process on the digital input signal reduced by the filtered noise estimate.

In some cases of the aforementioned embodiments, the data dependent noise prediction filter is a finite impulse response filter. In some such cases, the circuits further include an adaptable tap source that provides an adaptable tap to adaptively tune the data dependent noise prediction filter. In some instances, the adaptable tap source receives an output from the post-detector and a derivative of the digital input signal, and performs either a least means squared algorithm or zero-forcing algorithm to generate the adaptable tap. In particular instances of the aforementioned embodiments, the derivative of the digital input signal is the same as the digital input signal, while in other instances, the derivative of the digital input signal is a filtered version of the digital input signal.

In some instances of the aforementioned embodiments, the pre-detector is a Viterbi algorithm detector of a first length, the post-detector is a Viterbi algorithm detector of a second length, and the second length is greater than the first length. In various instances of the aforementioned embodiments, the post-detector is a Viterbi algorithm detector of a first length, the data dependent noise prediction filter is a finite impulse response filter of a second length, and first length is different from the second length.

Other embodiments of the present invention provide methods for data decoding that include receiving a series of digital samples; pre-detecting an estimated pattern in the series of digital samples; subtracting the estimated pattern from the series of digital samples to yield a noise estimate; filtering the noise estimate using a data dependent noise prediction filter to provide a filtered noise estimate; subtracting the filtered noise estimate from a derivative of the series of digital samples to provide a noiseless data input; post-detecting the noiseless data input to generate a detected output; and adaptively tuning the data dependent noise prediction filter based at least in part on the derivative of the series of digital samples and the detected output. In such embodiments, the data dependent noise prediction filter is tuned to detect a first noise pattern, and later adaptively tuned to detect a second noise pattern.

Yet other embodiments of the present invention provide communication systems. Such communication systems include a receiver with an analog to digital converter operable to receive an analog input and to provide a series of digital samples; a pre-detector that detects an estimated pattern in the series of digital samples; a summation element that subtracts the estimated pattern from the series of digital samples to yield a noise estimate; a data dependent noise prediction filter that is adaptively tuned to detect a noise pattern, and to provide a filtered noise estimate; and a post-detector that performs a data detection process on the series of digital samples reduced by the filtered noise estimate. In some cases, the analog input is transmitted by a transmitter to the receiver via a transfer medium. In some such cases, the system is a hard disk drive system where the transfer medium is a magnetic storage medium, and in other such cases, the system is a wireless communication system where the transfer medium is an atmosphere through witch a radio frequency signal is transmitted.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to systems and methods for processing information, and more particularly to systems and methods for processing information received in a data transfer operation.

Various embodiments of the present invention utilize a simplified data detector as a pre-detector designed to refine an input to a later, more complex data detector. The "pre-detector" utilizes a simplified subset of an overall target to perform an early estimation of a given data sequence. This early estimation of the data sequence is used to generate estimates of the ideal target values which are then subtracted from the incoming sample to get the estimated noise component of the received signal. These estimated noise samples are then used to de-correlate the current noise sample using filters for specific data patterns with filter coefficients based on statistical analysis. A data dependent noise prediction filter provides de-correlation that uses the feed-forward information from the pre-detector so the length of the filter and transition effect on the current bit (i.e., how the adjacent transitions in both directions affect the current bit) do not affect a final detector target. This allows a shorter final target for the later data detector, but still allows longer data dependent noise predictive filters. Since only the noise is extracted for de-correlation, the precision of the filters can also be higher with the same bit length.

Figure 1:
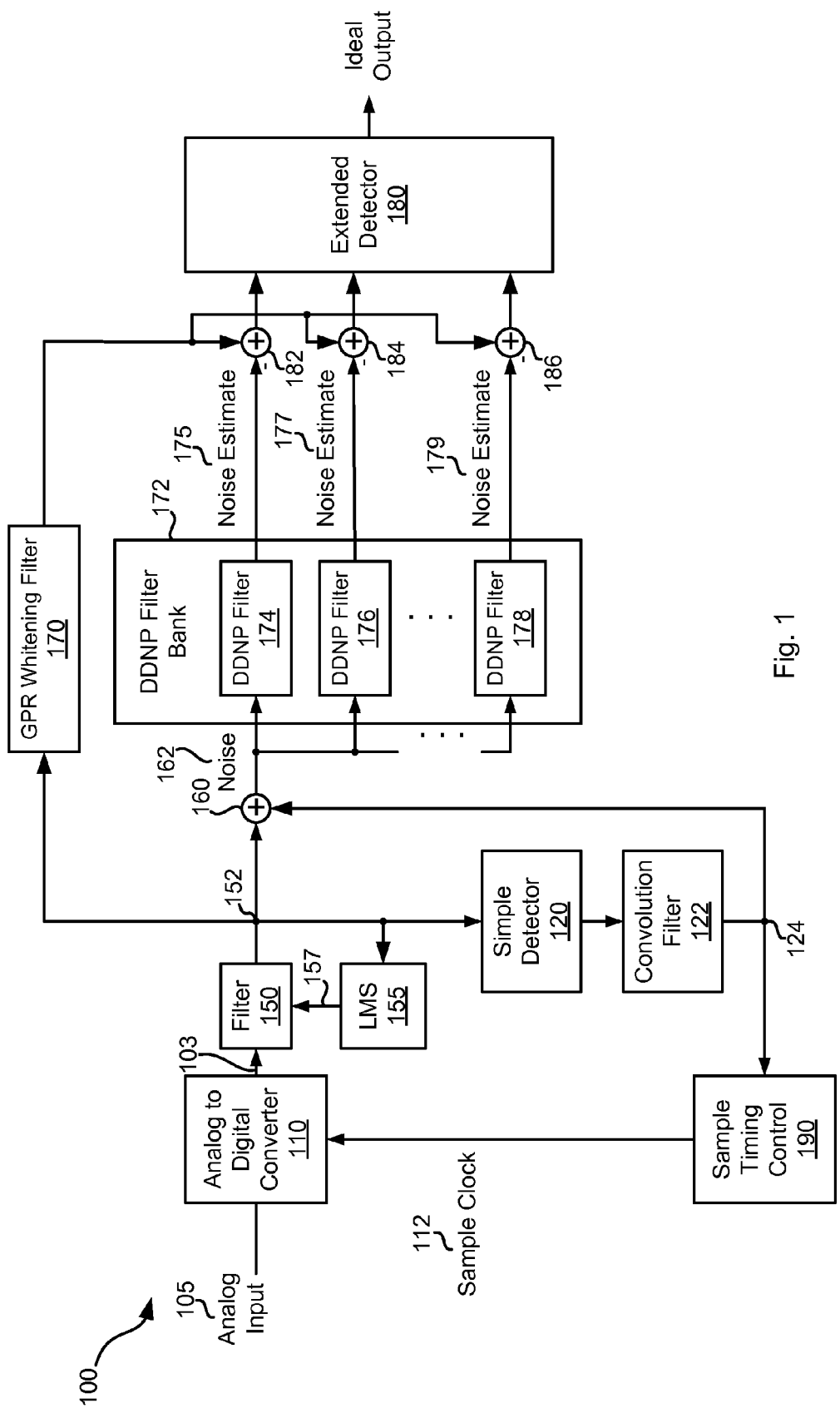
FIG. 1 depicts a data decoding system including pre-detection in accordance with various embodiments of the present invention.

Turning to FIG. 1, a data decoding system 100 including pre-detection is depicted in accordance with various embodiments of the present invention. Data decoding system 100 includes an analog to digital converter 110 that converts an analog input 105 into a series of digital samples 103 each synchronized to a sample clock 112. Respective digital samples 103 are provided on each cycle of sample clock 112 to a filter 150. Filter 150 may be a finite impulse response filter tailored for reducing any noise incorporated into analog input 105. A filtered output 152 from filter 150 is provided to a least means squared algorithm circuit 155 that calculates taps 157 for filter 150 as is known in the art.

In addition, filtered output 152 is provided to a simple detector 120 that performs a data detection using a simplified subset of an overall target (i.e., a simplified subset of the target of an extended detector 180) to perform an early estimation (i.e., determination of a most likely data pattern) of a given data sequence. In one particular embodiment of the present invention, simple detector 120 is a two bit Viterbi algorithm detector, and extended detector 180 is a Viterbi algorithm detector with a length greater than two bits. It should be noted that extended detector 180 is also referred to herein as a post-detector. Based on the disclosure provided herein, one of ordinary skill in the art will recognize a variety of detector lengths for simple detector 120 that may be used in accordance with various embodiments of the present invention. The output of simple detector 120 corresponds to the determined most likely pattern and is provided to a convolution filter 122 that in turn provides an estimated term 124 for the current sample. In some cases, the target used for convolution filter 122 is the final target of extended detector 180. In such cases, samples of filtered output 152 are statistically altered by the combination or simple detector 120 and convolution filter 122. The resulting output of convolution filter 122 is a noiseless estimate for the current received sample.

The result from convolution filter 122 is subtracted from filtered output 152 using a summation circuit 160. As the result from convolution filter 122 is a noiseless estimate for the current received sample, the output of summation circuit 160 is an estimate of noise 162 associated with the received sample. The result from convolution filter 122 is also provided to a sample timing control circuit 190 that is used to adjust sample clock 112. Sample timing control circuit 190 may be any circuit known in the art for adjusting the phase and/or frequency of an output clock based upon an input signal. As an example, sample timing control circuit 190 may be a phase lock loop or a delay lock loop circuit as are known in the art.

Noise estimate 162 is processed using a bank of data dependent noise prediction filters 172 that includes a number of data dependent noise prediction filters 174, 176, 178 each tuned to a respective, defined data pattern. In some embodiments of the present invention, data dependent noise prediction filters 174, 176, 178 are finite impulse response filters each tuned for a particular pattern. Of note, the length of data dependent noise prediction filters 174, 176, 178 is not governed by the length of extended detector 180. This allows for modification of data dependent noise prediction filters 174, 176, 178 without requiring a modification to extended detector 180. Each of data dependent noise prediction filters 174, 176, 178 operates as a de-correlation filter that de-correlates the noise component of the received signal. Noise prediction filters 174, 176, 178 each provide a respective noise estimate output 175, 177, 179. Of note, because only noise estimate 162 (a relatively small amplitude signal compared with the overall sample) is provided to data dependent noise prediction filters 174, 176, 178, the precision of the filters is greater than the same filter operating on the entire sample signal.

Data dependent noise prediction filters 174, 176, 178 estimate the noise correlation for specific data patterns included in filtered output 152. Minimum Euclidean distance calculations vary depending on the data pattern. The transition noise distribution is correlated to the data pattern since adjacent bits affect the transition noise of the current transition, and the amount of correlation may be determined through simulation processes using each different data pattern as an input. The information derived from the simulation can be used to determine which specific data patterns have the most correlation and will offer the best return for data dependent noise prediction. Based on this determination, data dependent noise prediction filters 174, 176, 178 may be hard wired for only those patterns that offer the greatest correlation, and therefore the best return for data dependent noise prediction. The number of noise prediction filters included filter bank 172 is selected based on the number of patterns to be tested. For example where a two bit pattern is to be tested, four noise prediction filters may be included to test all possible two bit patterns. Alternatively, where a three bit pattern is to be tested, eight noise prediction filters may be included to test all possible three bit patterns. As yet another alternative, where a longer pattern is to be tested it may not be practical to include a filter to test each and every possible pattern. In such situations, only a subset of the patterns may be tested. Based on the disclosure provided herein, one of ordinary skill in the art will appreciate that different numbers of noise prediction filters may be used depending upon the particular requirements of the implementation.

The Probability Density Function of the data dependent noise is described by a Gaussian distribution. The following equations summarize the aforementioned probability:

$$p(r_k \mid r_{k-}, b) = \frac{1}{\sqrt{2\pi\sigma_p^2(b)}} e^{-\frac{[r_k - \mu_p(b)]^2}{2\sigma_p^2(b)}},$$

where $r_k = s_k(b) + n_k(b)$ and $\mu_p$ represent the optimal linear prediction. Use of the noise predicted outputs results in the following change to the branch metric of extended detector 180 (i.e., the branch metric of a Viterbi algorithm detector where extended detector 180 is implemented as a Viterbi algorithm detector):

$$-\ln[p(r_k \mid r_{k-}, b)] = \ln[\sigma_p(b)] + \frac{[r_k - \mu_p(b)]^2}{2\sigma_p^2(b)}$$

$$= \ln[\sigma_p(b)] + \frac{[r_k - \hat{n}_k(b) - s_k(b)]^2}{2\sigma_p^2(b)}.$$

For noise that is uncorrelated to the data, the term $\mu_p(b) = s_k(b) + \hat{n}_k(b)$ is $s_k$ (ideal target) and $\sigma_p^2(b)$ becomes a constant and can be removed. In this case the equation will reduce down to the following normal Viterbi branch metric equation:

$$(r_k - s_k)^2.$$

Filtered output 152 is additionally provided to a noise whitening filter 170 that in this case is a generalized partial response filter that equalizes filtered output 152 to a given polynomial. Each of the aforementioned noise estimates 175, 177, 179 is subtracted from the output of noise whitening filter 170 using respective summation circuits 182, 184, 186. The outputs from each of summation circuits 182, 184, 186 represent digital samples 103 having been subjected to a noise reduction process and are provided to appropriate Branch Metric Units of extended detector 180. Extended detector 180 uses these improved samples in its branch metric difference calculations and also accounts for the correlated noise mean in those calculations. This will improve the bit error rate by de-correlating the noise of the received sample and allows a separate target for the Main FIR used for timing and bit sequence estimation. Of note, the taps provided to data dependent noise prediction filters 174, 176, 178 are hard coded. Other implementations discussed below in more detail allow for variable taps.

By separating estimated term 124 from filtered output 152 through use of an early detector or pre-detector (i.e., simple detector 120) to generate an estimate of the received data sequence, the noise term (i.e., the $n_k(b)$ term of the preceding equations) can then be used in the de-correlation filters to generate the final noise estimate for that sample. The actual filter coefficients can be computed using statistical analysis for each targeted data pattern. The estimated de-correlated noise (i.e., noise estimates 175, 177, 179 ) can then be subtracted from the current sample (i.e., filtered output 152) that has been equalized to an initial GPR target by whitening filter 170. Where extended detector 180 is a Viterbi algorithm detector, the final Viterbi detector target can be more elaborate than that of simple detector 120. Thus, filtered output 152 may be aided by the equalization of whitening filter 170 to translate the levels to those of extended detector 180. However, in some embodiments of the present invention, whitening filter 170 may be eliminated. Of note, the noise estimate in this case does not require any feedback from extended detector 180 since it only uses noise estimate 124 from the prediction process and feeds this information forward to extended detector 180.

As just some of many advantages, data decoding system 100 provides for increased error rate performance by providing data dependent noise prediction. Further, the architecture allows for longer noise prediction filters as the filter length is not tied to the length of any final target of the extended detector. Of note, the aforementioned noise prediction filters are capable of considering the effect that following bit transitions have on a current bit sample by inserting a delay in the feed forward path. This can be done without modifying the length of the final target of the extended detector, which avoids any unnecessary increase in design and operational complexity. Further, the use of the output from the simple detector to govern timing loop recovery allows for reduced latency in timing loop recovery compared to implementations where the output of an full length Viterbi detector is used as feedback.

Figure 2:
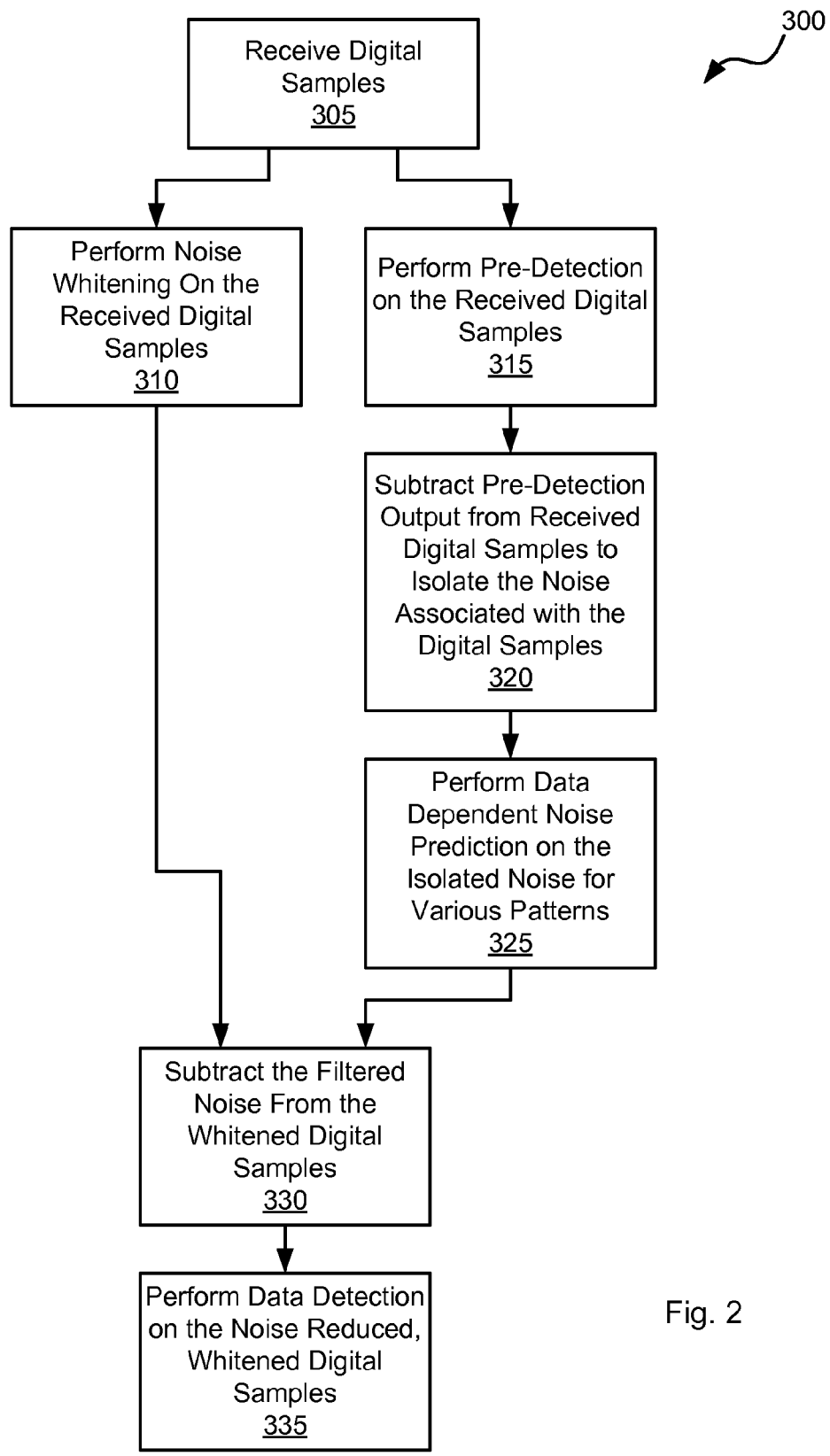
FIG. 2 is a flow diagram depicting a method for decoding information that includes use of pre-detection to isolate noise for data dependent filtering in accordance with one or more embodiments of the present invention.

Turning to FIG. 2, a flow diagram 300 depicts a method for decoding information that includes use of pre-detection to isolate noise for data dependent filtering in accordance with one or more embodiments of the present invention. Following flow diagram 300, a series of digital samples are received (block 305). In some cases, the digital samples are received from a finite impulse response filter operating on the output of an analog to digital converter. Based on the disclosure provided herein, one of ordinary skill in the art will recognize a variety of sources for such digital samples. The received digital samples are processed by a noise whitening filter (block 310). In some cases, the noise whitening filter is a generalized partial response filter. In addition, pre-detection is performed on the received digital samples (block 315). In some cases, the pre-detection is performed by a Viterbi algorithm detector that is relatively short compared with a later detector. The output from the pre-detection process is subtracted from the received digital samples (block 320). As the output from the pre-detection process is an estimate of the noiseless data within the received digital samples, subtracting them from the received digital data samples leaves an estimate of the noise included with the received digital data samples. This noise estimate is filtered using one or more data dependent noise prediction filters that are each tuned to a particular highly correlated noise pattern (block 325). The outputs from the data dependent noise prediction filters are subtracted from the output of the noise whitening filter (block 330). This provides noise reduced versions of the received digital data sample that may then be processed using a data detection algorithm (block 335). In some cases, this data detection algorithm is performed by a Viterbi algorithm detector that is relatively long compared to the pre-detector.

In contrast to the embodiments of the present invention discussed in relation to FIG. 1, other embodiments of the present invention provide variable taps to drive the data dependent noise prediction filters. Such variable taps allow for adaptation to changing noise statistics that are not adequately dealt with through using hard wired taps. Allowing for adaptation to changing noise statistics provides for increased error rate performance in at least some circumstances. Of interest some embodiments of the present invention utilize adaptation in relation to the data dependent noise prediction filters, but not in relation to the trellis target of the extended detector or other circuitry. Various implementations allow the pattern dependent variances be tracked separately from the noise predictive filters, and thus each implementation may have a distinct adaptation rate. By decoupling the variable taps from the trellis, a reasonable error rate may be achieved without the cost and complexity involved integrating variable taps with operation of other circuitry in the system. In particular, such embodiments of the present invention does not require the trellis target to be tracked and decouples the pattern dependent noise variance tracking and noise predictor tap adaptation, which results in a simpler implementation of pattern dependent noise prediction adaptation. In some embodiments of the present invention, a zero-forcing algorithm is used to implement the variable taps to data dependent noise prediction filters implemented as finite impulse response filters. In other embodiments of the present invention, a least mean squares algorithm is used to implement the variable taps to data dependent noise prediction filters implemented as finite impulse response filters. Based on the disclosure provided herein, one of ordinary skill in the art will recognize a variety of other approaches for generating variable taps designed for noise adaptation in accordance with other embodiments of the present invention. Of interest, the use of data dependent noise predictors allows for consideration of the effects of future transitions on a current bit.

Figure 3:
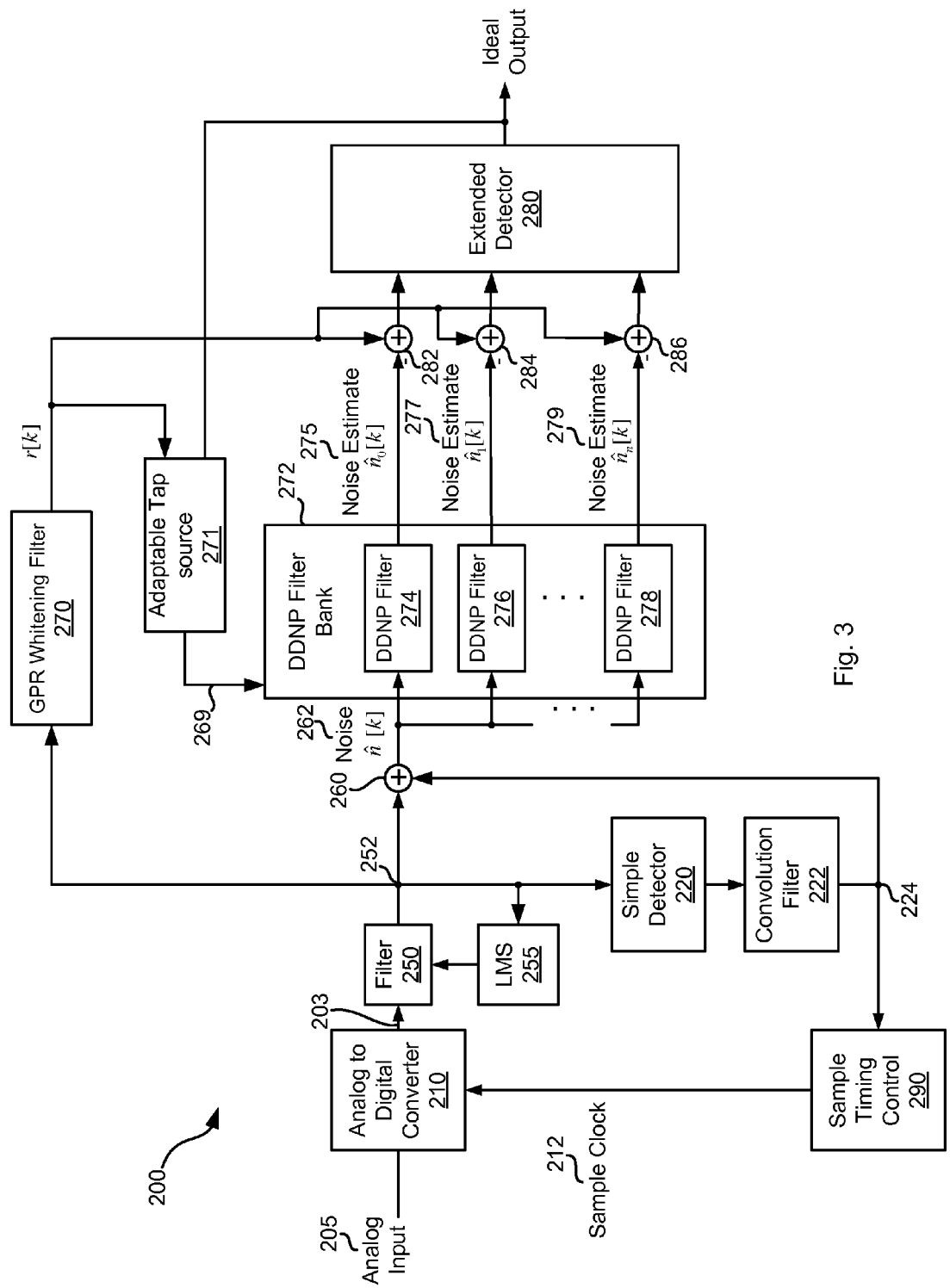
FIG. 3 depicts a data decoding system including pre-detection and variable taps in accordance with some embodiments of the present invention.

Turning to FIG. 3, a data decoding system 200 including pre-detection and variable taps is depicted in accordance with various embodiments of the present invention. Data decoding system 200 includes an analog to digital converter 210 that converts an analog input 205 into a series of digital samples 203 each synchronized to a sample clock 212. Respective digital samples 203 are provided on each cycle of sample clock 212 to a filter 250. Filter 250 may be a finite impulse response filter tailored for reducing any noise incorporated into analog input 205. A filtered output 252 from filter 250 is provided to a least means squared algorithm circuit 255 that calculates taps 257 for filter 250 as is known in the art.

In addition, filtered output 252 is provided to a simple detector 220 that performs a data detection using a simplified subset of an overall target (i.e., a simplified subset of the target of an extended detector 280) to perform an early estimation (i.e., determination of a most likely data pattern) of a given data sequence. In one particular embodiment of the present invention, simple detector 220 is a two bit Viterbi algorithm detector, and extended detector 280 is a Viterbi algorithm detector with a length greater than two bits. It should be noted that extended detector 280 is also referred to herein as a post-detector. The output of simple detector 220 corresponds to the determined most likely pattern and is provided to a convolution filter 222 that in turn provides an estimated term 224 for the current sample. In some cases, the target used for convolution filter 222 is the final target of extended detector 280. In such cases, samples of filtered output 252 are statistically altered by the combination of simple detector 220 and convolution filter 222. The resulting output of convolution filter 222 is a noiseless estimate for the current received sample (i.e., estimated term 224).

The result from convolution filter 222 is subtracted from filtered output 252 using a summation circuit 260. As the result from convolution filter 222 is a noiseless estimate for the current received sample, the output of summation circuit 260 is an estimate of noise 262 associated with the received sample. The result from convolution filter 222 is also provided to a sample timing control circuit 290 that is used to adjust sample clock 212. Sample timing control circuit 290 may be any circuit known in the art for adjusting the phase and/or frequency of an output clock based upon an input signal. As an example, sample timing control circuit 290 may be a phase lock loop or a delay lock loop circuit as are known in the art.

Noise estimate 262 is processed using a bank of data dependent noise prediction filters 272 that includes a number of data dependent noise prediction filters 274, 276, 278 each adaptively tuned to a particular pattern based on variable taps 269 received from an adaptable tap source 271. In some embodiments of the present invention, data dependent noise prediction filters 274, 276, 278 are finite impulse response filters tuned based upon variable taps 269 to detect various highly correlated noise patterns. Of note, the length of data dependent noise prediction filters 274, 276, 278 is not governed by the length of extended detector 280. This allows for modification of data dependent noise prediction filters 274, 276, 278 without requiring a modification to extended detector 280.

Where the noise predictive filters are implemented as finite impulse response filters, an adaptation approach applicable to finite impulse response filters may be used. Finite impulse response adaptation uses an input sequence and an ideal output sequence. Gradient information based on the difference between the actual finite impulse response output and an ideal output from the extended detector is used to update variable taps that are used to drive the finite impulse response filters. Two common methods for doing this are the Least Mean Squares (LMS) algorithm and the Zero-Forcing (ZF) algorithm. Thus, adaptable tap source 271 may be implemented, for example, using zero forcing equalization or least means squared equalization. For the sake of an example, assume that the data dependent noise predictive finite impulse response filters P taps, namely $h_1, h_2, \ldots h_p$. The input to each of these finite impulse response filters is the noise sequence ... ñ[k−2], ñ[k−1], ñ[k], ñ[k+1], ... based on the bit decisions from simple detector 220. The output of a given filter (e.g., any of data dependent noise prediction filters 274, 276, 278) is the noise estimate given by the following equation:

$$\hat{n}_0[k] = \sum_{m=1}^{P} h_0[m]\tilde{n}[k-m+\Delta].$$

Here, $\Delta$ is an integer that is greater than or equal to zero. When $\Delta$ is greater than zero, the finite impulse response predictor is using non-causal bit information for the noise prediction. To provide variable taps 269, ideal target values are needed. In this case, the ideal target values are the actual noise values seen for a specific pattern (i.e., noise estimates 275, 277, 279).

These ideal noise values may be obtained by keeping the original received samples from filter 250 and subtracting off the ideal trellis target that the equalized sample should have been. The ideal trellis targets may be found by convolving the final bit decisions from, for example, extended detector 280 or a post processor (not shown) with the generalized partial response (GPR) target. For each received sample, only one of the trellis targets will be the correct target, so only one data dependent noise prediction finite impulse response filter is updated for every input sample.

Let $n_i[k]$ be the actual noise value that the i-th data dependent noise predictor filter should have predicted. The aforementioned actual notice may be determined by subtracting the received sample $r[k]$ from the convolution of the filter output 252 with the GPR target, which results in the ideal Viterbi target $s[k]$. Let be the vector of ideal noise samples. Let be the vector of input samples to each of the N data dependent noise prediction filters, and let $ñ[k]=[ñ[k] \ldots ñ[k-P]]^T$ be the vector of output samples from the i-th data dependent noise prediction filter. Also, let $h_k^i=[h_i[1] \ldots h_i[P]]^T$ be the current filter coefficients for the i-th data dependent noise prediction filter, and let $h_{k+1}^i$ be the new filter coefficients of the i-th data dependent noise prediction filter after one update. Finally, let the error vector be defined as $e[k]=n[k]-ñ[k]$ and let t be the learning rate of the adaptation. In such a case, the zero-forcing update will be:

$$h_{k+1}^i = h_k^i + \mu e[k] * n[k],$$

where "*" operator is an element-by-element multiply. In the same case, the least means squared update will be:

$$h_{k+1}^i = h_k^i + \mu e[k] .* ñ[k].$$

The only difference in implementation is whether the error vector is multiplied by the ideal output for zero forcing or the actual input in the data dependent noise prediction filters for least means squared. While the updates look similar, they have very different theoretical interpretations. The selection of the i-th data dependent noise prediction filter is based on the ideal output (i.e., bit decision pattern) provided by extended detector 280.

Filtered output 252 is additionally provided to a noise whitening filter 270 that in this case is a generalized partial response filter that equalizes filtered output 252 to a given polynomial. Each of the aforementioned noise estimates 275, 277, 279 is subtracted from the output of noise whitening filter 270 using respective summation circuits 282, 284, 286. The outputs from each of summation circuits 282, 284, 286 represent digital samples 203 having been subjected to a noise reduction process and are provided to appropriate Branch Metric Units of extended detector 280. Extended detector 280 uses these improved samples in its branch metric difference calculations and also accounts for the correlated noise mean in those calculations. This will improve the bit error rate by de-correlating the noise of the received sample and allows a separate target for the Main FIR used for timing and bit sequence estimation. Of note, the taps provided to data dependent noise prediction filters 274, 276, 278 are hard coded. Other implementations discussed below in more detail allow for variable taps.

The overall branch metric unit for the i-th branch in extended detector 280 may be defined by the following equation:

$$\lambda_i = \frac{(r[k] - s_i[k] - \hat{n}_i[k])^2}{\sigma_i^2} + \ln \sigma_i^2.$$

The method discussed to this point has focused on predicting the $\hat{n}_i[k]$ terms (i.e., noise estimates 275, 277, 279). Theoretically, the pattern dependent variances are:

$$\sigma_i^2 = \lim_{N \to \infty} \frac{1}{N} \sum_{m=0}^{N} n_i^2[m],$$

where $n_i^2[m]=(r[m]-s_i)^2$ is the squared noise term for a specific data pattern. This sum requires an infinite number of realizations, which is impractical. However, it is possible to track this sum using the following formula:

$$(\sigma_i^2)_{new} = \alpha(\sigma_i^2)_{old} + (1-\alpha)n_i^2[m],$$

where $0<\alpha<1$ is the forgetting factor. When $\alpha$ is close to one, the algorithm weights the current estimate of the variance more than the current squared input noise sample. The value $\alpha$ can be a function of time. It is often the case that $\alpha$ will increase with time as the variance settles on the correct values. In fact, the variance is known to converge (asymptotically) to the correct value if $\alpha$ approaches one in the limit.

Figure 4:
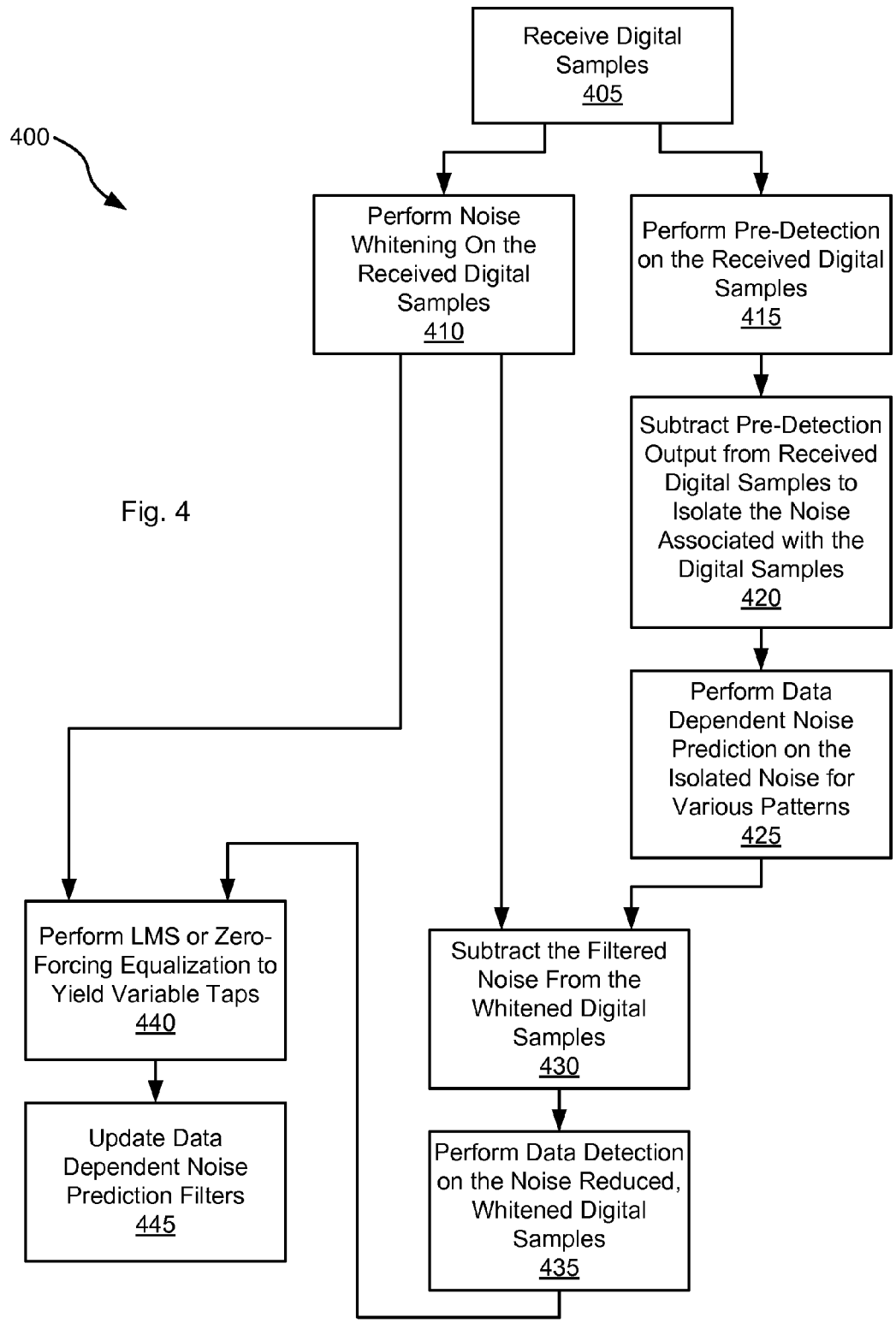
FIG. 4 is a flow diagram depicting a method for decoding information that includes use of pre-detection to isolate noise for data dependent filtering along with use of variable taps governing filter operation in accordance with one or more embodiments of the present invention.

Turning to FIG. 4, a flow diagram 400 depicts a method for decoding information that includes use of pre-detection to isolate noise for data dependent filtering in accordance with one or more embodiments of the present invention. Following flow diagram 400, a series of digital samples are received (block 405). In some cases, the digital samples are received from a finite impulse response filter operating on the output of an analog to digital converter. Based on the disclosure provided herein, one of ordinary skill in the art will recognize a variety of sources for such digital samples. The received digital samples are processed by a noise whitening filter (block 410). In some cases, the noise whitening filter is a generalized partial response filter. In addition, pre-detection is performed on the receive digital samples (block 415). In some cases, the pre-detection is performed by a Viterbi algorithm detector that is relatively short compared with a later detector. The output from the pre-detection process is subtracted from the received digital samples (block 420). As the output from the pre-detection process is an estimate of the noiseless data within the received digital samples, subtracting them from the received digital data samples leaves an estimate of the noise included with the received digital data samples. This noise estimate is filtered using one or more data dependent noise prediction filters that are each tuned to a particular highly correlated noise pattern (block 425). The outputs from the data dependent noise prediction filters are subtracted from the output of the noise whitening filter (block 430). This provides noise reduced versions of the received digital data sample that may then be processed using a data detection algorithm (block 435). In some cases, the pre-detection is performed by a Viterbi algorithm detector that is relatively long compared to the pre-detector.

The taps for the aforementioned data dependent noise prediction filters are adapted based on the output from the noise whitening filter (i.e., the input sequence) and the output from the later data detection process (i.e., the ideal output). The adaptation may be accomplished using a least means square processing algorithm or a zero-forcing algorithm (block 440). The variable taps that are provided are updated to the data dependent noise prediction filters (block 445).

Figure 5:
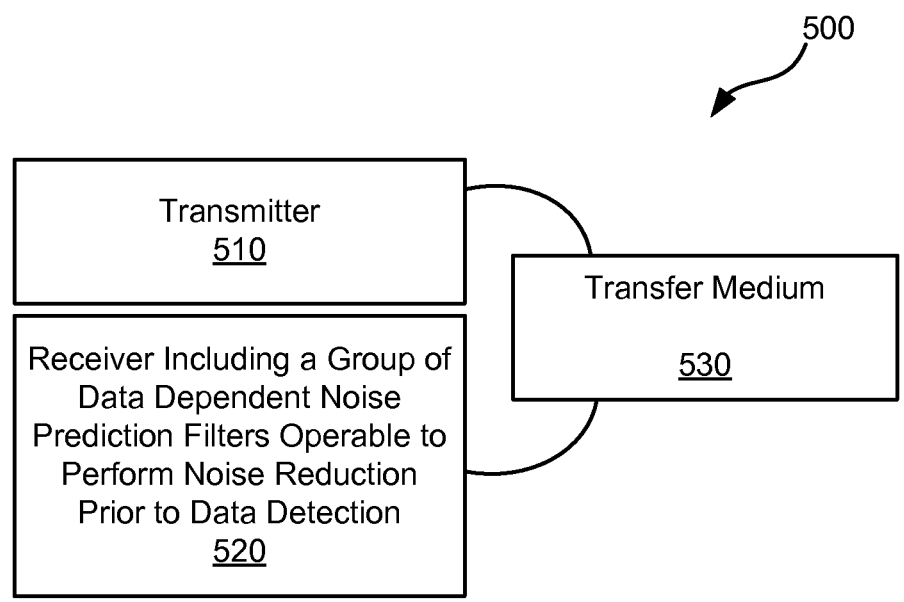
FIG. 5 depicts a data transmission system in accordance with various embodiments of the present invention.

Turning to FIG. 5, a communication system 500 is depicted that includes a group of matched filters used for clock reduction and/or clock selection latency reduction in accordance with some embodiments of the present invention. It should be noted that the phrase "communication system" is used in its broadest sense to mean any system capable of transferring information. Communication system 500 includes a transmitter 510, a transfer medium 530, and a receiver 520 that includes a group of matched filters that are used to implement clock reduction in a detector and/or clock selection latency reduction in a timing feedback loop. Transmitter 510 may be any circuit capable of receiving information for transmission via transfer medium 530. Thus, for example, where transfer medium is a magnetic storage medium of a hard disk drive, transmitter 510 may be a write head assembly capable of processing information for storage on the magnetic storage medium. In such a case, receiver 520 may be a read head and associated detection circuitry that is capable of processing the received information. Alternatively, where transmitter 510 is a transmitter of a wireless communication device such as a cellular telephone, transfer medium may be an atmosphere capable of transmitting wireless RF signals. In such a case, receiver 520 may be an antenna and associated detection circuitry that is capable of processing the received information. Receiver 520 may include any of the decoder systems discussed above in relation to FIGS. 1 and 3. Based on the disclosure provided herein, one of ordinary skill in the art will recognize a variety of communication systems to which receivers in accordance with one or more embodiments of the present invention may be applied.

In conclusion, the invention provides novel systems, devices, methods and arrangements for processing information. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data decoding circuit, the circuit comprising:
   a pre-detector operable to:
      receive a digital input signal; and
      apply a data detection algorithm to the digital input signal without first subtracting a filtered noise estimate from the digital input signal to yield an estimated pattern in the digital input signal;
   a summation element operable to subtract the estimated pattern from the digital input signal to yield a noise estimate; and
   a data dependent noise prediction filter operable to:
      filter the noise estimate and to provide the filtered noise estimate;
      subtract the filtered noise estimate from a derivative of the digital input signal to provide a noiseless data input;
      post-detect the noiseless data input to generate a detected output; and
      adaptively tune the data dependent noise prediction filter based at least in part on the derivative of the digital input signal and the detected output.

2. The data decoding circuit of claim 1, wherein the circuit further includes:
   a post-detector, operable to perform the post detect on the noiseless data input.

3. The data decoding circuit of claim 2, wherein the data dependent noise prediction filter is a finite impulse response filter.

4. The data decoding circuit of claim 3, wherein the circuit further includes:
   an adaptable tap source, wherein the adaptable tap source is operable to provide an adaptable tap to adaptively tune the data dependent noise prediction filter.

5. The data decoding circuit of claim 4, wherein the adaptable tap source is operable to receives an output from the post-detector and a derivative of the digital input signal, and wherein the adaptable tap source is operable to perform an algorithm selected from a group consisting of: a least means squared algorithm, and a zero-forcing algorithm.

6. The data decoding circuit of claim 5, wherein the derivative of the digital input signal is the same as the digital input signal.

7. The data decoding circuit of claim 5, wherein the summation element is a first summation element, and wherein the circuit further includes:
   a noise whitening filter, wherein the noise whitening filter operable to filter the digital input signal and to provide a filtered digital input signal;
   a second summation element, wherein the second summation element is operable to subtract the filtered noise estimate from the filtered digital input signal to provide a noise reduced input signal; and
   wherein the derivative of the digital input signal is the filtered digital input signal.

8. The data decoding circuit of claim 2, wherein the pre-detector is a Viterbi algorithm detector of a first length, wherein the post-detector is a Viterbi algorithm detector of a second length, and wherein the second length is greater than the first length.

9. The data decoding circuit of claim 2, wherein the post-detector is a Viterbi algorithm detector of a first length, wherein the data dependent noise prediction filter is a finite impulse response filter of a second length, and wherein the first length is different from the second length.

10. The data decoding circuit of claim 1, wherein the circuit further includes:
    an analog to digital converter, wherein the analog to digital converter is operable to receives an analog input and provides the digital input signal.

11. The data decoding circuit of claim 1, wherein the circuit further includes:
    an analog to digital converter, wherein the analog to digital converter is operable to receives an analog input and provides the digital output; and
    a main filter, wherein the main filter receives the digital output and provides the digital input signal.

12. A method for data decoding, the method comprising:
    receiving a series of digital samples;
    applying a data detection algorithm to the series of digital samples without first subtracting a filtered noise estimate from the series of digital samples to yield an estimated pattern in the series of digital samples;
    subtracting the estimated pattern from the series of digital samples to yield a noise estimate;
    filtering the noise estimate using a data dependent noise prediction filter, wherein the data dependent noise prediction filter is tuned to detect a first noise pattern, and wherein the data dependent noise prediction filter provides the filtered noise estimate;
    subtracting the filtered noise estimate from a derivative of the series of digital samples to provide a noiseless data input;

post-detecting the noiseless data input to generate a detected output; and adaptively tuning the data dependent noise prediction filter based at least in part on the derivative of the series of digital samples and the detected output.

13. The method of claim 12, wherein the data dependent noise prediction filter is a finite impulse response filter, and wherein adaptively tuning the data dependent noise prediction filter includes performing a least means squared algorithm on the derivative of the series of digital samples and the detected output to provide a tap to the finite impulse response filter.

14. The method of claim 12, wherein the data dependent noise prediction filter is a finite impulse response filter, and wherein adaptively tuning the data dependent noise prediction filter includes performing a zero-forcing algorithm on the derivative of the series of digital samples and the detected output to provide a tap to the finite impulse response filter.

15. The method of claim 12, wherein the derivative of the series of digital samples is the same as the series of digital samples.

16. The method of claim 12, wherein the method further comprises:

performing a noise whitening filter function on the series of digital samples to provide a filtered series of digital samples; and wherein the derivative of the series of digital samples is the filtered series of digital samples.

17. The method of claim 12, wherein pre-detecting the estimated pattern is done using a first Viterbi algorithm detector of a first length, and wherein post-detecting the noiseless data input is done using a second Viterbi algorithm detector of a second length.

18. The method of claim 17, wherein the second length is greater than the first length.

19. A communication system including a receiver, the communication system comprising:

a receiver, wherein the receiver includes:

an analog to digital converter operable to receive an analog input and to provide a series of digital samples;

a pre-detector, wherein the pre-detector is operable to:

receive the series of digital samples; and apply a data detection algorithm to the series of digital samples without first subtracting a filtered noise estimate from the series of digital samples to yield an estimated pattern in the series of digital samples;

a summation element, operable to subtract the estimated pattern from the series of digital samples to yield a noise estimate;

a data dependent noise prediction filter, wherein the data dependent noise prediction filter is operable to:

filter the noise estimate and to provide the filtered noise estimate; and subtract the filtered noise estimate from a derivative of the series of digital samples to provide a noiseless data input;

a post-detector, operable to perform a data detection process on the noiseless data input to yield a detected output; and wherein the data dependent noise prediction filter is further operable to adaptively tune the data dependent noise prediction filter based at least in part on the derivative of the series of digital samples and the detected output.

20. The communication system of claim 19, wherein the analog input is transmitted by a transmitter to the receiver via a transfer medium, and wherein the transfer medium is selected from a group consisting of: a magnetic storage medium, and an atmosphere through which a radio frequency signal is transmitted.

* * * * *